United States Patent [19]

Podszun

[11] Patent Number: 5,045,395
[45] Date of Patent: Sep. 3, 1991

[54] CROSSLINKED BEAD POLYMERS AND THEIR PREPARATION

[75] Inventor: Wolfgang Podszun, Cologne, Fed. Rep. of Germany

[73] Assignee: Bayer Aktiengesellschaft, Leverkusen, Fed. Rep. of Germany

[21] Appl. No.: 567,844

[22] Filed: Aug. 15, 1990

[30] Foreign Application Priority Data

Sep. 9, 1989 [DE] Fed. Rep. of Germany ....... 3930141

[51] Int. Cl.$^5$ ...................... C08F 8/00; C08F 246/00; C08F 230/08
[52] U.S. Cl. .................................. 428/402; 526/279; 526/301; 526/311; 526/314; 526/332; 525/326.5
[58] Field of Search ..................... 526/279; 525/326.5; 428/402

[56] References Cited

U.S. PATENT DOCUMENTS

| | | | |
|---|---|---|---|
| 3,706,697 | 12/1972 | Backderf | 526/225 |
| 4,048,422 | 9/1977 | Sackmann | 526/203 |
| 4,147,688 | 4/1979 | Makhlouf | 524/461 |
| 4,287,299 | 9/1981 | Himmelmann | 430/537 |
| 4,524,131 | 6/1985 | Himmelmann | 430/523 |
| 4,614,708 | 9/1986 | Timmermann | 430/517 |
| 4,861,818 | 8/1989 | Timmermann | 524/460 |

FOREIGN PATENT DOCUMENTS 0281928 9/1988 European Pat. Off.

OTHER PUBLICATIONS

Houben-Weyl, Methods of Organic Chemistry, vol. E20/I, p. 227.
Ullmann, Encyclopedia of Industrial Chemistry, vol. 19, p. 132.

Primary Examiner—Joseph L. Schofer
Assistant Examiner—M. Nagumo
Attorney, Agent, or Firm—Sprung Horn Kramer & Woods

[57] ABSTRACT

Crosslinked bead polymers having an average particle diameter in the range of from 0.5–10 μm and a narrow particle size distribution can be prepared by polymerization of vinyl monomers and silane monomer units which contain a hydrolysable group, the polymerization being carried out in a non-aqueous, polar medium using a free-radical former as the initiator in the presence of a polymer which is soluble in this medium and acts as a dispersant, and furthermore in the presence of a low molecular weight surfactant, and the resulting polymer is then crosslinked by the action of an aqueous acid or base.

17 Claims, No Drawings

CROSSLINKED BEAD POLYMERS AND THEIR PREPARATION

BACKGROUND OF THE INVENTION

The present invention relates to fine-particle, crosslinked bead polymers having a narrow particle size distribution and also to a process for their preparation.

Fine-particle bead polymers having a narrow particle size distribution, based for example on styrene or acrylic esters, are known. The preparation of substantially monodisperse particles of this type is carried out by a complicated 2-step process (Makromol. Chem. 180, (1979), 737; Adv. Coll. Interf. Sci. 13 (1980), 101). Pearl-like polymer particles having a relatively narrow particle size distribution can also be prepared by suspension copolymerization of maleic anhydride and α-olefins (DE-A-2,501,123, DE-A-2,919,822 and DE-A-3,144,793). Bead like graft copolymers whose grafted-on branches are composed of methacrylic acid/methyl methacrylate and whose graft base is composed of maleic acid/α-olefins have been disclosed in DE-A-3,331,542. EP-A-80,225 describes a method for the preparation of stable aqueous dispersions by which, for example, styrene bead polymer or methyl methacrylate bead polymer having a narrow particle size distribution can be obtained. DE-A-3,708,032 discloses fluorine-containing bead polymers having an average particle diameter of 0.5–10 μm and a narrow particle size distribution.

Fine particle bead polymers of this type having a narrow particle size distribution are used, among other applications, as matting agents or spacer materials in photographic recording elements. Another field of application is the preparation and processing of films. The bead polymers counteract the sticking together (blocking) of layers of film; they improve the surface slip characteristics and promote higher processing speeds. An important disadvantage of the known polymeric spacer materials is their low heat resistant and low solvent resistance, this greatly limiting their usefulness, particularly in the film field.

There is therefore a need for polymeric spacer materials having improved heat resistance.

SUMMARY OF THE INVENTION

The present invention accordingly provides bead polymers composed of vinyl monomers and crosslinked with Si—O—Si groups, having an average particle diameter in the range of from 0.5–10 μm, preferably 1–7 μm, and a narrow particle size distribution.

The present invention moreover provides a process for the preparation of crosslinked bead polymers having a particle diameter of 0.5–10 μm, preferably 1–7 μm, and a narrow particle size distribution, characterized in that 50–99 parts by weight of vinyl monomers and 1–50 parts by weight of silane monomers of the formula

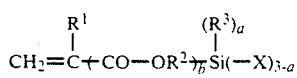

in which $R^1$ is hydrogen or methyl,
$R^2$ is straight-chain or branched $C_2$-$C_{12}$-alkylene whose carbon chain may be interrupted by —O—, —NH—, —COO— or —NH—COO—,
$R^3$ represents straight-chain or branched $C_1$-$C_6$-alkyl or phenyl,
X is a hydrolysable group,
a assumes the value zero, one or two and
b assumes the value zero or one, are polymerized in a non-aqueous, polar medium using a free-radical former as the initiator in the presence of a polymer which is soluble in this medium and has a molecular weight $M_w$ of $5 \times 10^3$ to $5 \times 10^5$, this polymer being present in an amount of 0.5–15% by weight relative to the amount of polar medium, and furthermore in the presence of a low molecular weight surfactant in an amount of from 0.2–5% by weight relative to the amount of medium, and the resulting polymer is then crosslinked by the action of aqueous acid or base.

DETAILED DESCRIPTION OF THE INVENTION

The bead polymers according to the invention contain 50–99% by weight of polymerized vinyl monomer units and 1–50% by weight of polymerized silane monomer units, preferably 75–98% by weight of vinyl monomer units and 2–25% by weight of silane monomer units, particularly preferably 85–98% by weight of vinyl monomber units and 2–15% by weight of silane monomer units. At least some of the silane monomer units are crosslinked via Si—O—Si groups, for example at least 50% up to the totality (100%) of possible Si—O—Si crosslinking.

Suitable crosslinking silane monomer units are those of the formula

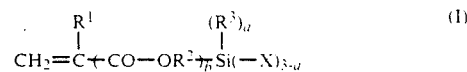

in which $R^1$ is hydrogen or methyl,
$R^2$ is straight-chain or branched $C_2$-$C_{12}$-alkylene whose carbon chain may be interrupted by —O—, —NH—, —COO— or —NH—COO—,
$R^3$ represents straight-chain or branched $C_1$-$C_6$-alkyl or phenyl,
X is a hydrolysable group,
a assumes the value zero, one or two and
b assumes the value zero or one.

Examples of straight-chain or branched alkylene having 2–12 carbon atoms are dimethylene, trimethylene, tetramethylene, pentamethylene, hexamethylene, octamethylene, decamethylene or dodecamethylene and also 1,2-propylene, 1,2- and 1,3-butylene and similarly known branched structures. Interruption of the carbon chain by —O—, —NH—, —COO— or —NH—COO— gives rise, in a known manner, to the classes of polyethers, polyamines, oligoesters or oligourethanes. Preference is given to the replacement of $C_2$-$C_{12}$-alkylene by $C_2$-$C_8$-alkylene whose carbon chain may be interrupted by —O—.

Examples of straight-chain or branched $C_1$-$C_6$-alkyl are methyl, ethyl, propyl, isopropyl, butyl, isobutyl, tert-butyl and also the known $C_5$- and $C_6$-hydrocarbon radicals.

Hydrolysable groups at the Si atom are known to a person skilled in the art and include, for example, halogen atoms such as fluorine, chlorine or bromine, in particular chlorine, alkoxy groups such as $C_1$-$C_6$- alkoxy, in particular methoxy or ethoxy, and also carboxylate and carboxamide groups such as acetate, propionate, acetylamino or propionylamino, and X is preferably a chlorine atom or the abovementioned alkoxy groups, particularly preferably methoxy and ethoxy.

The index a indicates that at least one hydrolysable group is located on the Si atom but that besides this there can be up to two $C_1$–$C_6$-alkyl groups or phenyls located on the Si atom.

The index b indicates that the vinyl group located at the left hand side in (I) may be bonded to the Si atom either directly or via the carboxyalkylene group.

Of the indices a and b, a preferably assumes the value zero and b preferably assumes the value one.

Preference is therefore given to silane monomer units of the formula

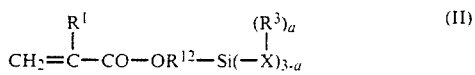

in which
  $R^{12}$ is straight-chain or branched $C_2$–$C_8$-alkylene whose carbon chain may be interrupted by —O— and
  $R^1$, $R^3$, X and a have the meaning given above.

Particular preference is given to the use of silane monomer units of the formula

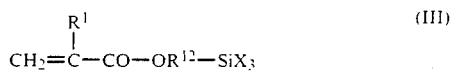

in which $R^1$, $R^{12}$ and X have the meaning given above.

The following are examples of suitable silane monomer compounds: Vinyl-trimethoxysilane, vinyl-triethoxysilane, vinyl-methyl-dimethoxysilane, vinyl-methyl-diethoxysilane, γ-methacryloyloxypropyl-trimethoxysilane, γ-methacryloyloxypropyl-triethoxysilane, γ-methacryloyloxypropyl-methyl-dimethoxysilane, γ-methacryloyloxypropyl-methyl-diethoxysilane, γ-acryloyloxypropyl-trimethoxysilane, γ-acryloyloxypropyl-triethoxysilane, γ-acryloyloxypropyl-methyl-dimethoxysilane and γ-acryloyloxypropyl-methyl-diethoxysilane.

The silane monomer units initially incorporated by polymerization into the pearl polymers according to the invention are converted in the further course of the preparation so that at least some of the hydrolysable groups are split off by hydrolysis and the resulting Si-OH groups are converted by condensation to Si—O—Si bridges.

The use of a mixture of a plurality of the abovementioned silane monomer compounds is likewise within the scope of the invention.

Suitable vinyl monomers for the crosslinked bead polymers according to the invention are one or more compounds from the group of unsubstituted or substituted straight-chain, branched or cyclic olefins and diolefins, of unsaturated carboxylic acids or derivatives thereof and of vinyl derivatives of carboxylic acids. Examples of these are: styrene, α-methylstyrene, vinyltoluene, substituted vinyltoluenes such as vinylbenzyl chlorides, butadiene, isobutylene, 2-chlorobutadiene, 2-methylbutadiene, vinylpyridine, cyclopentene, cyclopentadiene and the like; (meth)acrylic esters such as ethyl methacrylate, butyl methacrylate, butyl acrylate and hydroxymethyl methacrylate, acrylonitrile and the like; vinyl acetate, vinyl propionate and the like. Preference is given to the use of one or more vinyl monomers from the group consisting of styrene and the abovementioned (meth)acrylic esters, and particular preference is given to the use of one or more (meth)acrylic esters.

The average particle diameter of the bead polymers according to the invention is 0.5 to 10 μm, preferably 1–7 μm. The particle size distribution is narrow, in many cases almost monodisperse. The particle size distribution can be described with the aid of the value K which is the quotient of the second cumulant and the fourth power of the first cumulant from the cumulant analysis of the auto-correlation function of scattered laser light and is a measure of the breadth of the particle size distribution (J. Chem. Phys. 57 (1972) 4814–4820). The smaller K is, the narrower the particle size distribution. The K values for the bead polymers according to the invention are less than 0.5 and may include values approaching 0, for example 0.001–0.5, often 0.01–0.25.

The non-aqueous polar medium for the preparation of the bead polymers according to the invention includes one or more compounds of the group consisting of $C_1$–$C_8$-alkanols, of open-chain or cyclic $C_4$–$C_8$-ethers, of $C_1$–$C_6$-nitriles, of $C_1$–$C_6$-acid amides, of $C_3$–$C_6$-esters and of $C_3$–$C_6$-ketones. Examples are: methanol, ethanol, propanol, isopropanol, butanol, isobutanol, tert-butanol, hexanol, octanol, diethyl ether, dibutyl ether, dioxane, tetrahydrofuran, acetonitrile, propionitrile, dimethylformamide, methyl acetate, ethyl acetate, ethyl propionate, acetone, methyl ethyl ketone, methyl tert-butyl ketone and other compounds known to a person skilled in the art. Preference is given to the use of the abovementioned alcohols or a mixture thereof, in particular the $C_1$–$C_4$-alcohols. The polarity of the medium is adequate if one or more of the abovementioned polar compounds are present in the reaction medium at a concentration of at least 50% by weight.

The remainder, for example 0.1–50% by weight, of the reaction medium may be composed of non-polar hydrocarbons or halogenated hydrocarbons such as hexane, heptane, benzene, chlorobenzene and the like.

The polymerization medium is essentially anhydrous. However, the presence of water in minor amounts, for example of up to 5% by weight of the overall polar polymerization medium, is permissible. For instance, ethanol may be used in the form of the industrially available azeotrope with water. Where water content is concerned, other abovementioned solvents may also be used in the form in which they are customarily available in chemical technology.

The polymerization is carried out with the aid of a free-radical former as polymerization initiator. Free-radical formers of this type are known to a person skilled in the art and include, in particular, peroxo compounds and azo compounds. An example of a highly suitable compound is azodiisobutyronitrile. Free-radical formers of this type are used in an amount of from 0.05 to 5%, preferably 0.1 to 2%, relative to the total amount of comonomers.

Furthermore, the polymerization is carried out in the presence of a polymer which is soluble in the polymerization medium and has a molecular weight $M_w$ of $5 \times 10^3$ to $5 \times 10^5$, preferably $10^4$ to $2 \times 10^5$. This soluble polymer is used in an amount of from 0.5–15, preferably 1–10, % by weight relative to the amount of polymerization medium. This polymer functions as a dispersant and may be of natural or synthetic origin. Examples of these are: cellulose derivatives such as methylcellulose, ethylcellulose and hydroxypropylcellulose, vinyl acetate polymers such as polyvinyl acetate, ethylene-vinyl acetate copolymers having 50-90% by weight of vinyl acetate units in the copolymer, other vinyl acetate copolymers and partially hydrolysed polyvinyl acetates, for example those having a degree of hydrolysis of 5-25% of all acetate groups. Other suitable polymers are poly-N-vinylpyrrolidone (PVP), substituted PVP, poly-N-vinylcaprolactam and substituted derivatives thereof, copolymers of PVP and vinylcaprolactam, and other polymers which conform to the requirements concerning the given molecular weight and the abovementioned solubility.

The preparation of the crosslinked bead polymers according to the invention is furthermore carried out in the presence of a low molecular weight surfactant which is used in an amount of from 0.2-5% by weight, preferably 0.5-2% by weight, relative to the polymerization medium. Suitable surfactants may be nonionic or ionic surfactants, preferably ionic surfactants, particularly preferably cationic surfactants, these being basically known to a person skilled in the art. Among the many surfactants, examples of anionic surfactants include the sodium salts of sulphosuccinyl esters and examples of cationic surfactants include N-alkylammonium salts such as methyltricaprylammonium chloride.

The polymerization temperature is in the range of 50°-140° C. The polymerization temperature and the decomposition temperature of the free-radical former are adapted to one another. The pressure is basically not crucial to the polymerization; preference is therefore given to operation at atmospheric pressure. A pressure higher than atmospheric pressure may be advantageous if the polymerization is to be carried out in a low-boiling solvent at elevated temperature. Temperature control is furthermore promoted by operating at the boiling point of the polar polymerization medium. If relatively high-boiling reaction media are used, it may therefore be advantageous to operate at a somewhat reduced pressure (evaporative cooling).

The polymerization time is a few hours, often 2-12 hours and depends on, among other factors, the size of the reaction batch, in a known manner.

The particle diameter of the bead polymers according to the invention can be controlled by the combination of abovementioned polymerization parameters and can readily be determined by simple preliminary experiments. One essential polymerization parameter is the polarity of the polymerization medium. It has been determined that the particles are finer, the more polar the solvent; for instance, the particle diameter decreases throughout the series n-propanol, ethanol and methanol when these are used as the polymerization media. The blending of different members of the abovementioned compounds for the polar reaction medium then allows stepless adjustment to the desired particle diameter.

When the polymerization has ceased, the resulting polymer is treated with acidic or alkaline water to bring about crosslinking in the manner described above via Si—OH groups and the condensation of these groups to form Si—O—Si groups. For this purpose, acidic or alkaline water may be added to the polymerization batch and when crosslinking has ceased, the bead polymer is isolated by filtration and, if necessary, washed. However, since the polymer is precipitated from the polar, non-aqueous polymerization medium in the course of the polymerization, it may also be isolated in another variant of the process initially by filtration, it being possible to recycle the polymerization medium, and then by treating the filtered-off polymer in a separate second step with acidic or alkaline water to bring about crosslinking.

Acidic or alkaline water for this purpose means aqueous acids or alkalis, for example aqueous hydrochloric acid or sulphuric acid or aqueous sodium hydroxide solution or potassium hydroxide solution. The acidic or alkaline water is added to the polymerization batch or to the filtered-off polymer in an amount so that the polymerization batch or the slurry of filtered-off polymer in this water has a pH of from $-1$ to 3, preferably from 0 to 2, or from 11 to 14, preferably from 12 to 13. Preference is given to carrying out the hydrolysis and crosslinking under acidic conditions. Except where adjustment to the abovementioned pH is concerned, the amount of acidic or alkaline water is not crucial, particularly since the small amount of water which is required for at least partial hydrolysis and crosslinking is always present in sufficient quantity. In the variant in which acidic or alkaline water is added to the polymerization batch, a ratio of about 10% by weight of acidic or alkaline water relative to the polymerization batch has proved advantageous. The hydrolysis and crosslinking can be carried out at a temperature of 0°-50° C., preferably at room temperature; the reaction time allowed, chiefly dependent on the batch size, is from 15 minutes up to a few hours.

The crosslinking reaction and the ultimate degree of crosslinking obtained can readily be monitored and checked analytically by determining the solubility in a good solvent, for example in tetrahydrofuran/ethyl acetate or dimethylformamide. Before the crosslinking reaction, the bead polymers obtained in the polymerization step are slightly soluble (gel content in tetrahydrofuran at 25° C. generally below 5%), while after the crosslinking reaction, the bead polymers are insoluble (gel content in tetrahydrofuran at 25° C. greater than 90%). The shape, size and particle size distribution of the bead polymer are unaltered during the crosslinking reaction.

In contrast with the known uncrosslinked bead polymers, the bead polymers according to the invention have a significantly improved solvent resistance and heat resistance.

EXAMPLE 1

A reaction flask fitted with a reflux condenser, stirrer and thermometer was used to dissolve 28 g of polyvinylpyrrolidone, 4 g of methyltricaprylammonium chloride and 0.32 g of azodiisobutyronitrile in 800 ml of methanol. To this solution were added 50 g of a monomer mixture of 47.5 g of methyl methacrylate and 2.5 g of γ-methacryloyloxypropyl-trimethoxysilane. The mixture was heated under reflux with stirring for 5 hours. The mixture was then cooled to 25° C., and 50 ml of 1N HCl were added dropwise in the course of 30 minutes. Stirring was continued for a further 1 hour at 25° C., then the bead polymer was isolated by centrifuging, washed with methanol and dried at 50° C. in vacuo.

Yield: 31 g;

THF-insoluble component: 97.5%; Average particle size: 4.5 μm, K=0.15 (measured using laser scattered-light spectroscopy).

EXAMPLE 2

Example 1 was repeated, mixtures of methyl methacrylate and γ-methacryloyloxypropyltrimethoxysilane (γ-MAPTMOS) being used in the amounts tabulated below:

| No. | Methyl methacrylate g | γ-MAPTMOS g | Yield [g] | Insol. component [%] | diam. [μm] |
|---|---|---|---|---|---|
| A | 48.75 | 1.25 | 34 | 76 | 3.8 |
| B | 45 | 5 | 35 | 98 | 4.0 |
| C | 40 | 10 | 32 | 100 | 3.9 |
| D | 35 | 15 | 30 | 100 | 4.3 |

EXAMPLE 3

Following the method described in Example 1, 135 g of methyl methacrylate and 6.75 g of γ-methacryloyloxypropyltrimethoxysilane were added to a solution of 75.6 g of polyvinylpyrrolidone, 10.8 g of methyltricaprylammonium chloride and 0.91 g of azodiisobutyronitrile in 2,160 ml of the solvent given below, and this mixture was brought into reaction. When the polymerization had ceased, 135 ml of 1N HCl were added dropwise within a period of 60 minutes.

| No. | Solvent | Yield [g] | diam. [μm] | K |
|---|---|---|---|---|
| A | Methanol | 80 g | 3.8 | 0.08 |
| B | Methanol/ethanol (1:1) | 81 g | 5.3 | 0.17 |
| C | Ethanol | 78 g | 6.5 | 0.22 |
| D | Ethanol/isopropanol (1:1) | 72 g | 7.4 | 0.64 |

What is claimed is:

1. Bead polymers made from vinyl monomers selected from the group consisting of (meth)acrylates and styrenes and crosslinked by Si—O—Si groups, these polymers having an average particle diameter in the range of from 0.5–10 μm and a particle size distribution represented by a K value of from about 0.001–0.5.

2. The bead polymers of claim 1, having an average particle diameter in the range of from 1–7 μm.

3. The crosslinked bead polymers of claim 1, containing 50–99% by weight of polymerized vinyl monomer units and 1–50% by weight of polymerized silane monomer units at least some of which are crosslinked via Si—O—Si groups.

4. The bead polymers of claim 3, containing 75–98% by weight of vinyl monomer units and 2–25% by weight of silane monomer units.

5. The bead polymers of claim 4, containing 85–98% by weight of vinyl monomer units and 2–15% by weight of silane monomer units.

6. The crosslinked bead polymers of claim 1, wherein the crosslinking Si—O—Si groups are derived from silane monomer units of the formula

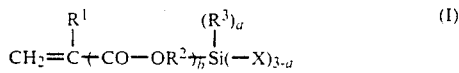

in which

R$^1$ is hydrogen or methyl,

R$^2$ is straight-chain or branched C$_2$-C$_{12}$-alkylene whose carbon chain may be interrupted by —O—, —NH—, —COO— or —NH—COO—, R$^3$ represents straight-chain or branched C$_1$-C$_6$-alkyl or phenyl, X is a hydrolysable group, a assumes the value zero, one or two and b assumes the value zero or one.

7. The crosslinked bead polymers of claim 6, wherein the crosslinking Si—O—Si groups are derived from silane monomer units of the formula

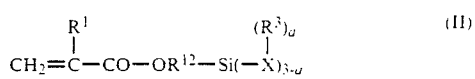

in which

R$^{12}$ is straight-chain or branched C$_2$-C$_8$-alkylene whose carbon chain may be interrupted by —O— and R$^1$, R$^3$, X and a have the meaning given in claim 6.

8. The crosslinked bead polymers of claim 7, wherein the crosslinking Si—O—Si groups are derived from silane monomer units of the formula

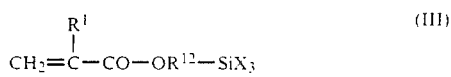

in which

R$^1$, R$^{12}$ and X have the meaning given in claim 7.

9. The crosslinked bead polymers of claim 6, wherein the hydrolysable group is a chlorine atom or straight-chain or branched C$_1$-C$_6$-alkoxy group, a carboxylate or a carboxamide group.

10. The crosslinked bead polymers of claim 9, wherein the hydrolysable group is a chlorine atom or straight-chain or branched C$_1$-C$_6$-alkoxy.

11. The crosslinked bead polymers of claim 1, wherein the vinyl monomer(s) is (are) one or more methacrylic esters.

12. Crosslinked bead polymers having a particle diameter in the range of from 0.5–10 μm and a particle size distribution represented by a K value of from about 0.001–0.5, which are prepared by polymerization of 50–99% by weight of vinyl monomers selected from the group consisting of (meth)acrylates and styrenes and 1–50% by weight of silane monomer units of the formula

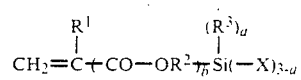

in which

R$^1$ is hydrogen or methyl

R$^2$ is straight-chain or branched C$_2$-C$_{12}$-alkylene whose carbon chain may be interrupted by —O—, —NH—, —COO— or —NH—COO.

R$^3$ represents straight-chain or branched C$_1$-C$_6$-alkyl or phenyl,

X is a hydrolysable group, a assumes the value zero, one or two and b assumes the value zero or one, in a non-aqueous, polar medium using a free-radical former as the initiator in the presence of a polymer which is soluble in this medium and has a molecular weight M$_w$ of $5 \times 10^3$ to $5 \times 10^5$, this polymer being present in an amount of 0.5–15% by weight relative to the amount of medium, and furthermore in the presence of a low molecular weight surfactant in an amount of from 0.2–5% by weight relative to the amount of medium, followed by crosslinking of the resulting polymer by the action of aqueous acid or base.

13. The crosslinked bead polymers of claim 12, having a particle diameter of 1–7 μm.

14. The crosslinked bead polymers of claim 12, wherein the non-aqueous polar medium used is a $C_1$–$C_8$-alkanol, an open-chain or cyclic $C_4$–$C_8$-ether, a $C_1$–$C_6$-nitrile, a $C_1$–$C_6$-acid amide, a $C_3$–$C_6$-ester, a $C_3$–$C_6$-ketone or a mixture of a plurality of these, it being possible for a medium of this type to contain up to 50%, relative to its overall weight, of non-polar hydrocarbons or halogenated hydrocarbons.

15. The crosslinked bead polymers of claim 12, wherein a nonionic or ionic surfactant is used.

16. The crosslinked bead polymers of claim 15, wherein a ionic surfactant is used.

17. The crosslinked bead polymers of claim 12, wherein the polymer which is soluble in the non-aqueous, polar medium is a cellulose derivative or a vinyl acetate polymer.

* * * * *